July 9, 1957 H. ALLAN 2,798,620
TRUCK LEVELER FOR LOADING DOCKS
Filed Dec. 15, 1953 2 Sheets-Sheet 1
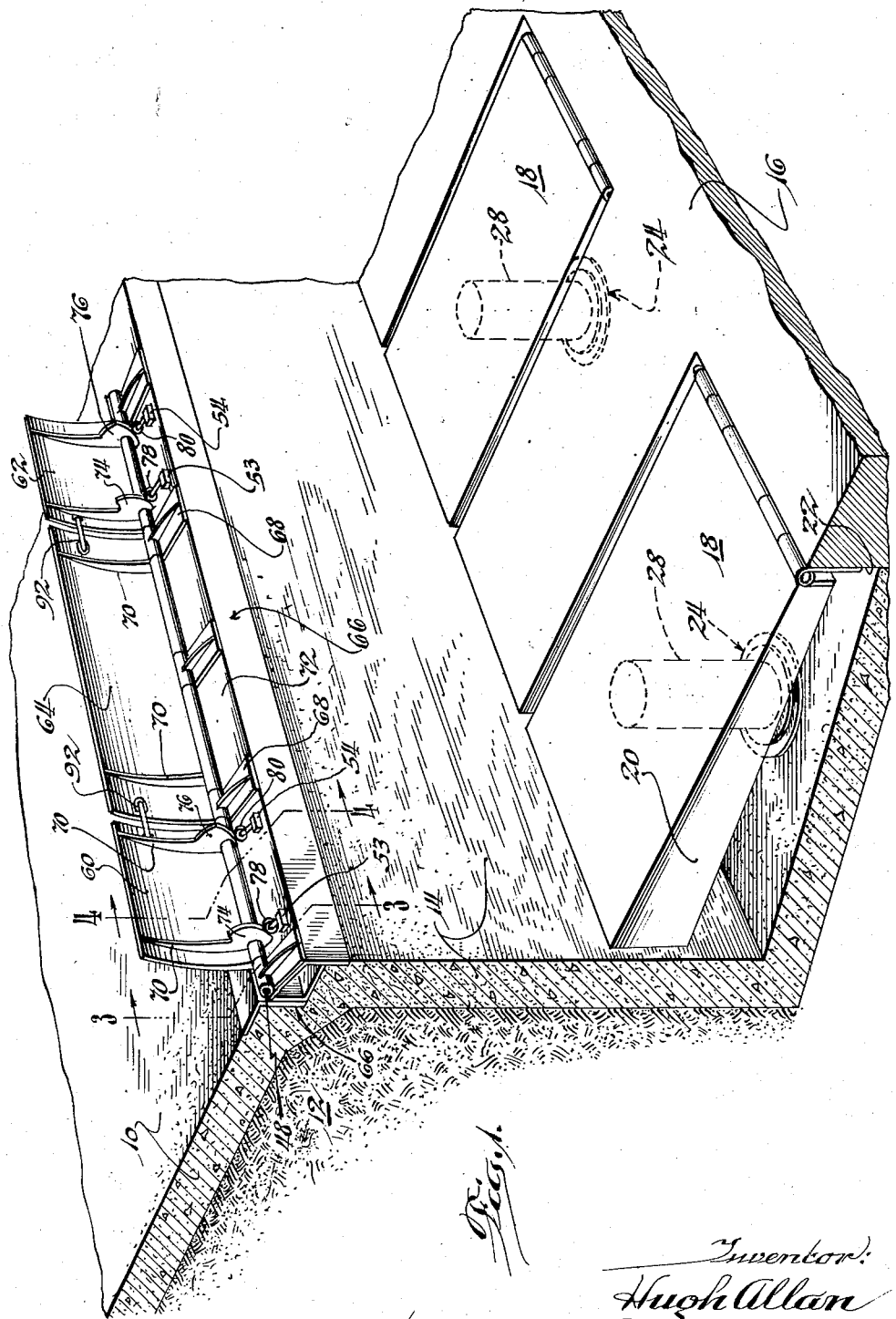

July 9, 1957 H. ALLAN 2,798,620
TRUCK LEVELER FOR LOADING DOCKS
Filed Dec. 15, 1953 2 Sheets-Sheet 2
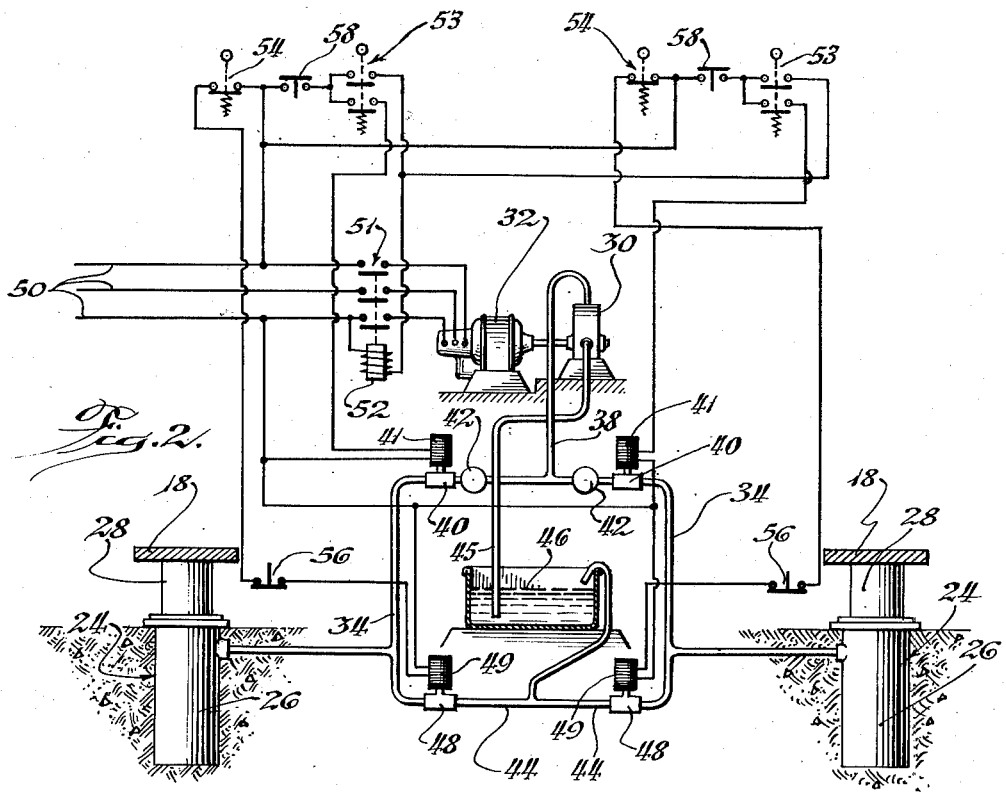
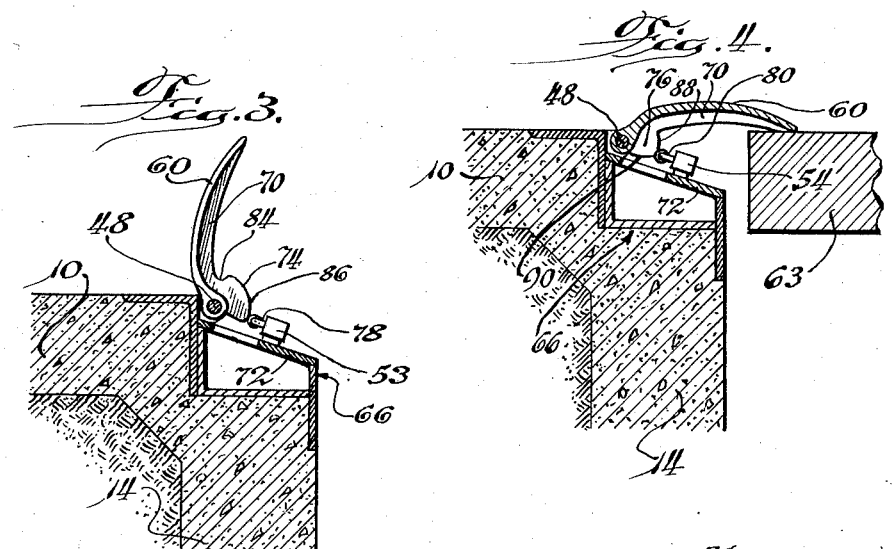
Inventor:
Hugh Allan
By Ahlberg, Nupper, Gradolph
Attorneys

United States Patent Office 2,798,620
Patented July 9, 1957

2,798,620

TRUCK LEVELER FOR LOADING DOCKS

Hugh Allan, Memphis, Tenn., assignor to Dover Corporation, a corporation of Delaware Application December 15, 1953, Serial No. 398,337

2 Claims. (Cl. 214—38)

The present invention relates to loading docks for highway trucks.

One object of the invention is to provide an improved truck loading installation of the dock type, in which a more efficient utilization of the dock platform is realized by maintaining the rear edge of a truck bed being loaded or unloaded level and in alignment with the outer edge of the dock platform, which is free of surface irregularities or fixtures which would interfere with traffic in any direction along the dock.

A more specific object is to provide an improved truck loading installation of the above character, in which the rear edge of a truck bed is maintained in continuous flush alignment with the outer edge of the dock platform by movable truck wheel supports which are power actuated to compensate for variations in the truck bed height of different vehicles and for the lateral tilting of a truck bed on its wheels due to such factors as uneven loading of the truck, unbalanced truck springs, and the movement of loading vehicles on and off the truck.

Other objects and advantages will become apparent from the following description of the form of the invention shown in the drawings, in which—

Fig. 1 is a perspective view of a highway truck dock incorporating the invention, the dock being illustrated in readiness to receive a truck;

Fig. 2 is a diagrammatic view of the self-controlled truck leveling and height adjusting system used in the dock;

Fig. 3 is a fragmentary side view of an enlarged scale, taken along the line 3—3 of Fig. 1; and Fig. 4 is a fragmentary side view, taken along the line 4—4 of Fig. 1, illustrating the coaction of a swingable leaf with the rear edge of a truck bed, the leaf being shown in a horizontal position.

The highway truck dock incorporating the invention comprises a platform 10 which may be of the type which is hydraulically raised, but for simplicity is shown as a concrete slab resting on a fill 12 and extending forwardly to overlie a vertical retainer wall 14. A parking apron 16 extends forwardly on a lower level from the wall 14.

Two vertically movable wheel platforms 18 are mounted in the apron 16 adjacent the wall 14, and spaced apart to support the two rearmost wheels (not shown) of a truck backed up to the dock platform 10. As shown, each wheel platform 18 comprises a rectangular slab 20 hinged at its outer end to swing vertically within a recess 22 formed within the apron 16.

Each wheel platform 18 is independently raised and lowered by a power lift formed by a hydraulic jack 24 comprising a cylinder 26 set into concrete below the recess 22 for the platform and a piston 28 projecting upwardly and operably connected to the platform.

As shown diagrammatically in Fig. 2, the wheel platform jacks 24 are energized by a hydraulic system including a pump 30 driven by an electric motor 32. This hydraulic system is symmetrical with respect to the two power lift jacks.

Two branches 34 of a pressure fluid supply line 38 from the pump 30 are connected to the respective jacks 24. A normally closed solenoid valve 40 and a check valve 42 interposed in each supply line branch 34, control the flow of fluid into the jacks 24 and prevent the backflow of fluid to the pump 30.

Exhaust lines 44 from the respective jacks 24 lead to a reservoir 46 which supplies fluid to the inlet 45 of the pump 30. Lowering of each jack is controlled by a normally closed solenoid valve 48 interposed in its exhaust line 44.

The pump motor 32 is supplied with three phase power through three power lines 50. Starting and stopping of the motor to supply fluid for raising either of the jacks 24 is controlled by a gang switch 51 which is closed upon energization of a solenoid 52.

Raising and lowering of the two jacks 24 independently of each other is controlled by a raising switch 53 and a lowering switch 54 for each jack. As shown, the lowering switch 54 for each jack is connected between two of the power lines 50 in series with the solenoid operator 49 for the exhaust valve 48 for the jack. Lowering of each wheel platform 18 below a desired lowermost level is prevented by the opening of a limit switch 56 suitably mounted in association with the platform and interconnected in the electrical circuit to the exhaust valve solenoid 49.

As shown, the raising switch 53 for each jack 24 is of the double pole, single throw type. One pole of the switch is connected between two of the power lines 50 in series with the solenoid 41 for the raising valve for the jack. The other pole of the switch 52 is connected between two of the power lines 50 in series with the solenoid 52 which closes the motor switch 51. A limit switch 58 connected in series with both poles of the switch 53 is suitably mounted for coaction with the associated wheel platform to break the circuits to the motor energizing solenoid 52 and to the raising valve solenoid 41 when the platform has reached its highest allowable position.

The raising and lowering switches 53, 54 for the respective wheel platforms 18 are operated by two throw-over leaves 60, 62 swingably mounted on the dock platform 10 to bridge the space between the outer edge of the platform and the rear edge of the bed 63 (Figs. 1 and 4) of a truck (not shown) backed up to the dock and having its two rearmost wheels resting on the respective wheel platforms 18. In the preferred construction shown, the two control leaves 60, 62 are pivotally mounted at opposite ends of a similar throw-over leaf 64 so that the outer edges of the two control leaves rest on opposite sides of the truck bed. The combined length along the dock of the three leaves 60, 62, and 64 is somewhat less than the width of a typical truck bed, the control leaves 60, 62 each being considerably shorter than the central leaf 64.

As shown, the support assembly 66 for the three throw-over leaves 60, 62, 64 comprises a number of angle irons and elongated metal plates suitably fixed together and mounted at the outer edge of the platform 10. A plurality of brackets 68 spaced along the support assembly 66 define supports for a horizontal hinge pin 48 forming a pivotal mount for each of the throw-over leaves 60, 62, 64.

The leaves 60, 62, 64 are all curved slightly downwardly to assure close contact of the outer end of each leaf with the truck bed. Each leaf is reinforced on its underside by two transverse reinforcing ribs 70.

As shown in Figs. 1, 3, and 4, the raising and lowering switches 53, 54 for each wheel platform 18 are mounted on a sloping plate 72 for operation by cams 74 and 76 formed on the two reinforcing ribs 70 of the respective control leaves 60, 62. The raising switch 53 and lowering switch 54 for each wheel platform are spring biased to closed position and are opened by cam follower plungers 78, 80 which engage the respective control leaf cams 74, 76.

The cams 74 and 76 of each control leaf are so shaped that both the raising and lowering switches 53 and 54 controlled by the leaf are held in open position when the leaf is supported in a horizontal attitude by the bed 63 of a truck being loaded or unloaded. The raising switch cam 74 is relieved to form a notch 84 (Fig. 3) which permits operation of the coacting plunger 78 to close the switch 53 when the control leaf is tilted downwardly to a slight degree. On the other hand, a downwardly extending heel 86 on the cam 74 will maintain the raising switch 53 open even though the control leaf is raised to a substantially vertical position.

The lowering cam 76 is shaped at 88 to maintain the lowering switch 54 open upon downward tilting of the control leaf. However, the underside of this cam is sharply relieved at 90 to provide for quick closure of the lowering switch 54 upon upward tilting movement of the control leaf.

The two control leaves 60, 62 are connected to opposite ends of the leaf 64 by lost motion links 92 which permit some vertical swinging movement of the leaves relative to each other.

When a loading or unloading operation has been completed, the three throw-over leaves 60, 62, and 64 connected together by the links 92 are ordinarily swung up to raised positions, as shown in Fig. 1. This allows both of the lowering switches 54 to close, opening the two solenoid exhaust valves 48. Both wheel platforms 18 immediately move downwardly to their lowermost positions in which the limit switches 56 open, thus allowing the two exhaust valves to close.

After a truck has been backed into loading position with its rearmost wheels resting on the platforms 18, and its parking brake has been applied, the throw-over leaves 60, 62, 64 are swung over to engage the rear edge of the truck bed 63, as shown in Fig. 4. At this time both control leaves 60, 62 will ordinarily tilt downwardly because the height of the platform 10 above the platforms 18, when in lowermost position, is somewhat greater than the maximum height of conventional truck beds. The two raising switches 53 are operated independently to bring the rear edge of the truck bed into level flush alignment with the fixed outer edge of the platform 10.

In the event that the level of the truck bed on either or both sides of the truck should then rise, as when a load has been removed from the truck, the control leaves 60, 62 will operate the lowering switches 54 as necessary to bring the truck bed back into alignment with the dock platform 10.

Thus the independent control provided for the two spaced wheel platforms 18 is capable of compensating not only for variations in the overall height of the truck bed, but also for tilting of the truck bed on its wheels due to such factors as uneven loading of the truck, unbalanced springs on opposite sides of the truck, or the movement of loading vehicles on and off the truck bed.

It will be appreciated that the substantially flush alignment thus maintained between the rear edge of a truck bed being loaded or unloaded, and the fixed outer edge of the dock platform 10 eliminates any need for using an inclined ramp or the like to permit loading vehicles to move on and off the truck. Hence, the dock platform 10 is free of surface irregularities or fixtures which would interfere with traffic of vehicles in any direction along the dock platform. Loading vehicles, such as fork lift and hand trucks, thus have a level surface to travel on in moving onto or coming off the bed of a truck backed up to the dock. This greatly facilitates loading and unloading and makes for maximum efficiency in the use of the dock platform space.

While I have shown and described a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. In an installation for loading and unloading highway trucks, the combination of a raised loading platform, two vertically movable wheel supports disposed at a lower level immediately in front of said platform in positions relative to each other to support respectively the rearmost wheels on opposite sides of a truck backed up to said platform, two hydraulic jacks mounted in supporting relation to said respective wheel supports, each of said jacks including a cylinder and a plunger reciprocable therein and extending therefrom in supporting relation to the associated wheel support, means forming a source of operating fluid under pressure, two supply lines connected between said source of fluid under pressure and said respective cylinders to carry fluid under pressure into each cylinder to extend said plunger therein for raising the wheel support associated therewith, two control valves connected into said respective supply lines for opening and closing the latter, means forming two exhaust passages communicating with the portions of said respective supply lines between said valves and said cylinders for exhausting fluid from the respective cylinders to allow retraction of said plungers thereof for lowering the associated wheel supports, two exhaust valves connected to said respective exhaust passageways for opening and closing the latter, a pair of independent control means for said respective jacks arranged for engagement with and vertical movement by the respective sides of the rear end of the sprung portion of a truck backed onto said wheel supports, two independent valve operating means connected between said supply line valves and said control means for said respective jacks to open each supply line valve upon downward movement of the control means therefor below a predetermined level to effect admission of fluid under pressure from said source into the jack connected to the valve to raise the associated wheel support, and two independent valve operating means connected between said exhaust valves and said control means for said respective jacks to open each exhaust valve upon upward movement of said control means therefor above a predetermined level to exhaust fluid from the jack connected to the valve to lower the associated wheel support; said predetermined levels of said pair of independent jack control means being related to said platform to provide and maintain through operation of said jacks by said control means, said supply line valve operating means, and said exhaust valve operating means, a flush vertical alignment between the outer edge of said platform and both sides of the rear end of the bed of a truck backed onto said wheel supports.

2. In an installation for loading and unloading highway trucks, the combination of a raised loading platform, two vertically movable wheel supports disposed at a lower level immediately in front of said platform in position relative to each other to support respectively the rearmost wheels on opposite sides of a truck backed up to said platform, two hydraulic jacks mounted in supporting relation to said respective wheel supports, each of said jacks including a cylinder and a plunger reciprocable therein and extending therefrom in supporting relation to the associated wheel support, a reservoir for hydraulic fluid, a pump connected to said reservoir for supplying operating fluid under pressure, an electric motor connected in driving relation to said pump, two fluid supply lines connected between the outlet of said pump and said respective cylinders to conduct hydraulic fluid under pressure into each cylinder to extend said plunger therein for raising the wheel support associated therewith, two solenoid control valves connected into said respective supply lines for opening and closing the latter, means forming two exhaust passages communicating with the portions of said respective supply lines between said valves and said cylinders and connected with said reservoir for exhausting fluid from said respective cylinders to allow retraction of said plungers thereof for lowering the associated wheel supports, two solenoid exhaust valves connected into said respective exhaust passages for opening and closing the latter, a pair of independent control means for said respective wheel supports arranged for engagement with and vertical movement by the respective sides of the rear end of the bed of a truck backed onto said wheel supports, electric power supply means for said pump motor including switches mounted in coacting relation to said respective wheel support control means to energize said motor upon downward movement of either of said control means below a predetermined level, two independent electrical circuits connected with said respective supply line solenoid valves and including switches mounted in coacting relation to said control means for said respective wheel supports to effect opening of the supply line to each wheel support jack upon downward movement of the control means therefor below said predetermined level, and two electrical control circuits connected to said respective exhaust passage valves and including switches mounted in coacting relation to said respective control means to effect opening of the exhaust passage from each wheel support jack upon upward movement of the control means therefor above a predetermined level, the combination thus formed serving to provide and maintain a flush alignment between the outer edge of said platform and both sides of the rear end of the bed of a truck backed onto said wheel supports.

References Cited in the file of this patent

UNITED STATES PATENTS

| | | |
|---|---|---|
| 2,099,636 | Weaver | Nov. 16, 1937 |
| 2,489,869 | Dunn | Nov. 29, 1949 |
| 2,560,064 | Astry | July 10, 1951 |
| 2,565,072 | French | Aug. 21, 1951 |